US012789841B2

(12) United States Patent
Dytso et al.

(10) Patent No.: US 12,789,841 B2
(45) Date of Patent: Nov. 10, 2026

(54) ANSWER-SET-BASED AUTONOMOUS DRIVING

(71) Applicant: QUALCOMM Incorporated, San Diego, CA (US)

(72) Inventors: Alex Dytso, Princeton, NJ (US); Westley Thomas Gebauer, Carlsbad, CA (US); Jubin Jose, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/827,977

(22) Filed: Sep. 9, 2024

(65) Prior Publication Data

US 2026/0035008 A1 Feb. 5, 2026

Related U.S. Application Data

(60) Provisional application No. 63/679,315, filed on Aug. 5, 2024.

(51) Int. Cl.
*B60W 60/00* (2020.01)
*B60W 50/00* (2006.01)
*G06N 20/00* (2019.01)

(52) U.S. Cl.
CPC .......... *B60W 60/001* (2020.02); *B60W 50/00* (2013.01); *G06N 20/00* (2019.01); *B60W 2556/45* (2020.02)

(58) Field of Classification Search
CPC ............... B60W 60/001; B60W 50/00; B60W 2556/45; G06N 20/00
See application file for complete search history.

(56) References Cited

U.S. PATENT DOCUMENTS

| | | | | |
|---|---|---|---|---|
| 12,043,279 | B2 * | 7/2024 | Conroy | G01C 21/3461 |
| 12,097,875 | B1 * | 9/2024 | Lukarski | B60W 40/06 |
| 12,441,371 | B2 * | 10/2025 | Rosales | B60W 40/08 |
| 2019/0196465 | A1 * | 6/2019 | Hummelshøj | G05D 1/0038 |
| 2020/0371518 | A1 * | 11/2020 | Kang | B60W 30/18163 |
| 2020/0394455 | A1 * | 12/2020 | Lee | G06N 20/00 |
| 2022/0001892 | A1 * | 1/2022 | Fairley | B60W 60/0011 |
| 2023/0362196 | A1 * | 11/2023 | Lee | G06N 20/00 |
| 2024/0377834 | A1 * | 11/2024 | Kim | B60W 30/06 |
| 2025/0103048 | A1 * | 3/2025 | Mehrotra | G05D 1/0214 |
| 2025/0264337 | A1 * | 8/2025 | Pham | G01C 21/3469 |

FOREIGN PATENT DOCUMENTS

| | | | | |
|---|---|---|---|---|
| CN | 109278758 A * | 1/2019 | | B60W 50/00 |
| EP | 3659889 A1 * | 6/2020 | | B60W 10/184 |
| EP | 3819181 A1 * | 5/2021 | | B60W 10/04 |

(Continued)

*Primary Examiner* — Babar Sarwar
(74) *Attorney, Agent, or Firm* — Thien T. Nguyen

(57) ABSTRACT

A method of determining acceptable actions for autonomous driving includes: obtaining, at an ego vehicle, a set of input values indicative of a driving environment of the ego vehicle; and evaluating, by the ego vehicle, the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

19 Claims, 12 Drawing Sheets

(56) References Cited

FOREIGN PATENT DOCUMENTS

| | | | | | |
|---|---|---|---|---|---|
| EP | 3916696 | A1 | * | 12/2021 | ............. H04L 67/12 |
| EP | 4328765 | A1 | * | 2/2024 | ............ B60W 50/14 |
| EP | 4397561 | A1 | * | 7/2024 | ........ B60W 50/0205 |
| EP | 4229855 | B1 | * | 1/2025 | ........... G06N 3/0475 |

* cited by examiner

1000

$$
\begin{aligned}
&\frac{3X_1}{X_4} - 2X_{10} + \frac{X_{10} min(X_{14}, X_{15})}{X_4} + \frac{X_{10} min\left(X_{15}, \frac{X_{12}}{X_4}\right)}{X_4} - 2X_{11} - 2X_{14} \\
&+ \frac{2X_{16} min\left(X_3, max(X_4, X_5)\right)}{min(X_{15}, X_5)} + \frac{X_{16} min\left(max(X_{10}, X_4), max\left(X_3, min(X_{15}, X_5)\right)\right)}{X_2} \\
&+ \frac{X_{16} min\left(max(X_{10}, X_4), max\left(min(X_{15}, X_5), min(X_3, X_4)\right)\right)}{X_2} - 2X_3 - 4X_5 \\
&+ \frac{-X_{13} + X_9}{min(X_3, X_4)} + \frac{-2X_{16} + X_3}{min(X_3, X_4)} - 2\left(-\frac{X_1}{X_4} + X_{10}\right) min(X_{15}, X_5) \\
&- 6max\left(X_{14}, min(X_3, X_4)\right) - max\left(X_3, \frac{X_1}{X_4}\right) - max\left(X_3, \frac{X_{12}}{X_4}\right) \\
&- 4max\left(X_5, min(X_3, X_4)\right) - 2max\left(min(X_3, X_4), min\left(X_{15}, X_5, max(X_{10}, X_4)\right)\right) \\
&+ \frac{2min(X_{15}, X_5)}{mim\left(X_3, max(X_4, X_5)\right)} + \frac{2(X_4 - X_7)}{(X_{11} + X_8) max(X_{10}, X_2)} \\
&+ \frac{2(-5X_{16} + X_3)}{(X_{10} - X_2)\left(X_{11} + max\left(min(X_3, X_4), min(X_{14}, X_{15}, X_5)\right)\right)} + \frac{2X_6}{X_{11} logi(X_{14}, X_3)}
\end{aligned}
$$

FIG. 10

ANSWER-SET-BASED AUTONOMOUS DRIVING

CROSS-REFERENCE TO RELATED APPLICATIONS

This application claims the benefit of U.S. Provisional Application No. 63/679,315, filed Aug. 5, 2024, entitled "ANSWER-SET-BASED AUTONOMOUS DRIVING," which is assigned to the assignee hereof, and the entire contents of which are hereby incorporated herein by reference for all purposes.

BACKGROUND

Vehicles are becoming more intelligent as the industry moves towards deploying increasingly sophisticated self-driving technologies that are capable of operating a vehicle with little or no human input, and thus being semi-autonomous or autonomous. Autonomous and semi-autonomous vehicles may be able to detect information about their location and surroundings (e.g., using ultrasound, radar, lidar, an SPS (Satellite Positioning System), and/or an odometer, and/or one or more sensors such as accelerometers, cameras, etc., and/or one or more communication technologies (e.g., for communicating with other vehicles and/or network entities such as roadside units)). Autonomous and semi-autonomous vehicles typically include a control system to interpret information regarding an environment in which the vehicle is disposed to identify hazards and determine a navigation path to follow.

A driver assistance system may mitigate driving risk for a driver of an ego vehicle (i.e., a vehicle configured to perceive the environment of the vehicle) and/or for other road users. Driver assistance systems may include one or more active devices and/or one or more passive devices that can be used to determine the environment of the ego vehicle and, for semi-autonomous vehicles, possibly to notify a driver of a situation that the driver may be able to address. The driver assistance system may be configured to control various aspects of driving safety and/or driver monitoring. For example, a driver assistance system may control a speed of the ego vehicle to maintain at least a desired separation (in distance or time) between the ego vehicle and another vehicle (e.g., as part of an active cruise control system). The driver assistance system may monitor the surroundings of the ego vehicle, e.g., to maintain situational awareness for the ego vehicle. The situational awareness may be used for one or more purposes, e.g., to determine whether and how to change lanes, to notify the driver of issues (e.g., another vehicle being in a blind spot of the driver, another vehicle being on a collision path with the ego vehicle), etc. The situational awareness may include information about the ego vehicle (e.g., speed, location, heading) and/or other vehicles or objects (e.g., location, speed, heading, size, object type, etc.).

A state of an ego vehicle may be used as an input to a number of driver assistance functionalities, such as an Advanced Driver assistance System (ADAS). Downstream driving aids such as an ADAS may be safety critical, and/or may give the driver of the vehicle information and/or control the vehicle in some way.

SUMMARY

An example method of determining acceptable actions for autonomous driving includes: obtaining, at an ego vehicle, a set of input values indicative of a driving environment of the ego vehicle; and evaluating, by the ego vehicle, the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

An example ego vehicle includes: at least one transceiver; at least one memory; and at least one processor communicatively coupled to the at least one transceiver and the at least one memory and configured to: obtain a set of input values indicative of a driving environment of the ego vehicle; and evaluate the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

Another example ego vehicle includes: means for obtaining a set of input values indicative of a driving environment of the ego vehicle; and means for evaluating the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

An example non-transitory, processor-readable storage medium includes processor-readable instructions to cause at least one processor of an ego vehicle to: obtain a set of input values indicative of a driving environment of the ego vehicle; and evaluate the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

An example method of establishing a traffic-rule model for autonomous driving includes: determining, at an apparatus, a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determining, at the apparatus, the traffic-rule model, that is at least one of time-bounded and of a static memory allocation, by fitting a model to the plurality of input data sets, the plurality of answer sets, and a set of traffic rules corresponding to each of the plurality of answer sets.

An example apparatus includes: at least one memory; and at least one processor communicatively coupled to the at least one memory and configured to: determine a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determine a traffic-rule model, that is at least one of time-bounded and of a static memory allocation, by fitting a model to the plurality of input data sets, the plurality of answer sets, and a set of traffic rules corresponding to each of the plurality of answer sets.

Another example apparatus includes: means for determining a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and means for determining a traffic-rule model, that is at least one of time-bounded and of a static memory allocation, by fitting a model to the plurality of input data sets, the plurality of answer sets, and a set of traffic rules corresponding to each of the plurality of answer sets.

Another example non-transitory, processor-readable storage medium includes processor-readable instructions to cause at least one processor of an apparatus to: determine a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determine a traffic-rule model, that is at least one of time-bounded and of a static memory allocation, by fitting a model to the plurality of input data sets, the plurality of answer sets, and a set of traffic rules corresponding to each of the plurality of answer sets.

BRIEF DESCRIPTION OF THE DRAWINGS

FIG. 10 is an example of a mathematical expression for an example symbol regression model for determining an answer set.

DETAILED DESCRIPTION

Figure 1:
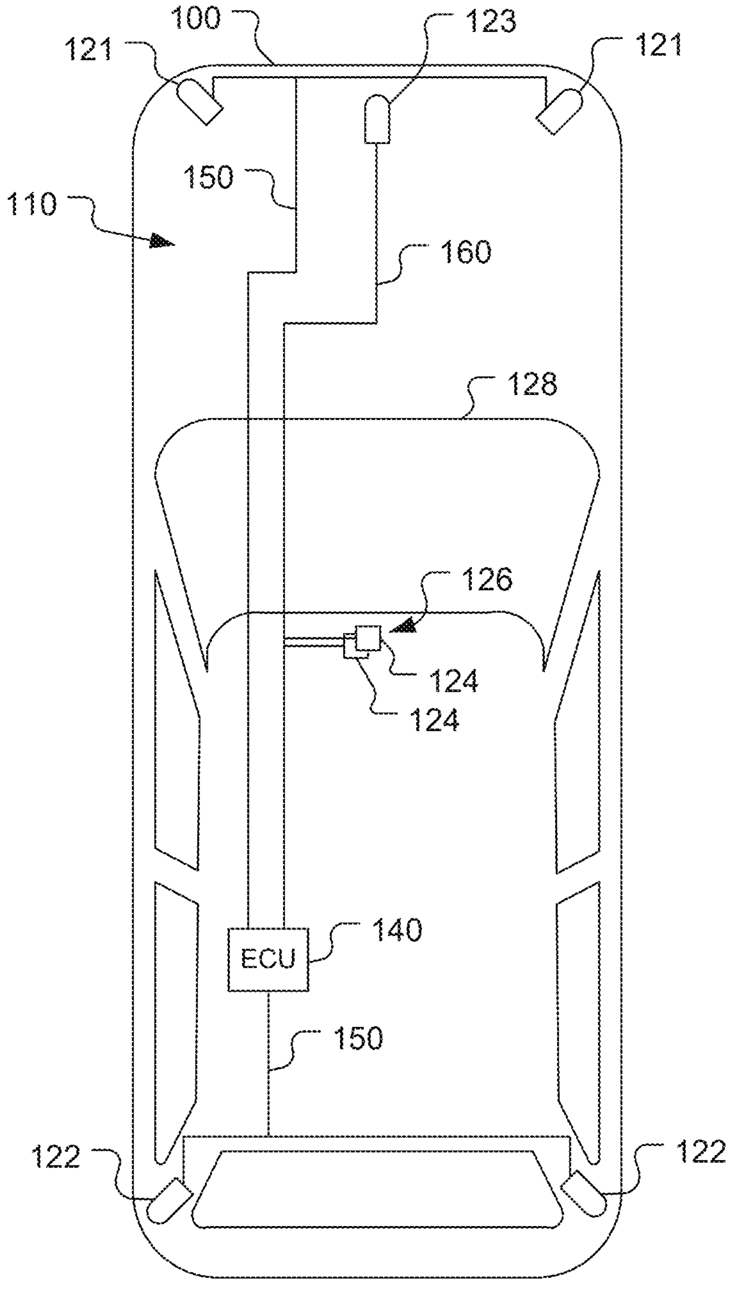
FIG. 1 is a simplified diagram of an example of a wireless communications system.

Techniques are discussed herein for performing traffic-rule reasoning for autonomous driving (although the disclosure may have applicability beyond autonomous driving, e.g., to guided, rule-based motion generally). For example, a model may be developed offline, where time and memory resources for developing the model are not a concern or are at least less of a concern than such resources when used in real time during guided motion, e.g., autonomous driving. The model may be a time-bounded, static-memory-allocation traffic-rule model for providing answer sets of acceptable driving actions based on present status of input variables (e.g., driving environment conditions) and traffic rules. An entity, e.g., a server, that develops the model may develop multiple time-bounded, static-memory-allocation traffic-rule models and select a model that is more (or most) efficient, e.g., that uses less (or the least) amount of memory, of available models. An ego vehicle may obtain the selected model (e.g., be programmed with the model during manufacture, or receive the model (or model updates) after manufacture (e.g., from a server)) and apply the model in real time, e.g., at a rate of 60 Hz, to determine one or more available/acceptable actions based on a present driving environment. The available/acceptable action(s) may be used by an ADAS (Advanced Driver assistance System) of the ego vehicle to make a driving decision (e.g., accelerate, brake, turn, do nothing, etc.). Techniques discussed provide real-time traffic rule reasoning that is interpretable and scalable, provide offline answer set programming, provide decision trees for answer set programming, and provide symbolic regression for answer set programming. These are examples, and other examples may be implemented.

Items and/or techniques described herein may provide one or more of the following capabilities, as well as other capabilities not mentioned. One or more available driving actions may be determined within a time boundary, that is known before initiation of determination of the available action(s), and/or within a static memory allocation, that is allocated before initiation of determination of the available action(s). One or more available driving actions may be determined by an ego vehicle in real time (e.g., while driving and/or at a rate of 60 Hz or higher) without dynamic memory allocation. A model (e.g., algorithm) used to determine an answer set of available motion (e.g., driving) actions based on a set of inputs indicative of an environment (e.g., a driving environment) and based on motion (e.g., traffic) rules may be lay-person readable. That is, a non-expert may readily discern how input data indicative of an environment are processed to determine the available action(s). Certification, e.g., by a safety regulator, may be facilitated, e.g., by having a model used to determine an answer set of available motion actions be lay-person readable. Safer, smoother, more efficient, scalable autonomous driving may be achieved, e.g., by enhancing operation of traffic rule reasoning. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, automobile, etc.) used to communicate over a wireless communications network. A UE may be mobile or may (e.g., at certain times) be stationary, and may communicate with a Radio Access Network (RAN). As used herein, the term "UE" may be referred to interchangeably as a "mobile wireless signaling device", an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® short-range wireless communication technology networks (e.g., based on IEEE (Institute of Electrical and Electronics Engineers) 802.11, etc.) and so on. Two or more UEs may communicate directly in addition to or instead of passing information to each other through a network.

Referring to FIG. 1, an ego vehicle 100 includes an ego vehicle driver assistance system 110. The driver assistance system 110 may include a number of different types of sensors mounted at appropriate positions on the ego vehicle 100. For example, the system 110 may include: a pair of divergent and outwardly directed sensors 121 mounted at respective front corners of the vehicle 100, a similar pair of divergent and outwardly directed radar sensors 122 mounted at respective rear corners of the vehicle, a forwardly directed LRR sensor 123 (Long-Range Radar) mounted centrally at the front of the vehicle 100, and a pair of generally forwardly directed optical sensors 124 (cameras) forming part of an SVS 126 (Stereo Vision System) which may be mounted, for example, in the region of an upper edge of a windshield 128 of the vehicle 100. Each of the sensors 121 may include an LRR and/or an SRR (Short-Range Radar). The various sensors 121-124 may be operatively connected to a central electronic control system which is typically provided in the form of an ECU 140 (Electronic Control Unit) mounted at a convenient location within the vehicle 100. In the particular arrangement illustrated, the front and rear MRR sensors 121, 122 (Mid-Range Radar) are connected to the ECU 140 via one or more conventional Controller Area Network (CAN) buses 150, and the LRR sensor 123 and the sensors of the SVS 126 are connected to the ECU 140 via a serial bus 160 (e.g., a faster FlexRay serial bus).

Collectively, and under the control of the ECU 140, the various sensors 121-124 may be used to provide a variety of different types of driver assistance functionalities. For example, the sensors 121-124 and the ECU 140 may provide blind spot monitoring, adaptive cruise control, collision prevention assistance, lane departure protection, and/or rear collision mitigation.

The CAN bus 150 may be treated by the ECU 140 as a sensor that provides ego vehicle parameters to the ECU 140. For example, a GPS module may also be connected to the ECU 140 as a sensor, providing geolocation parameters to the ECU 140.

The vehicle 100 may also include one or more communication devices configured to communicate wirelessly with other entities, e.g., network-based entities such as transmission/reception points (TRPs). The communication device(s) are not shown in FIG. 1, but examples of such devices are discussed herein, e.g., with respect to FIGS. 2 and 5.

Figure 2:
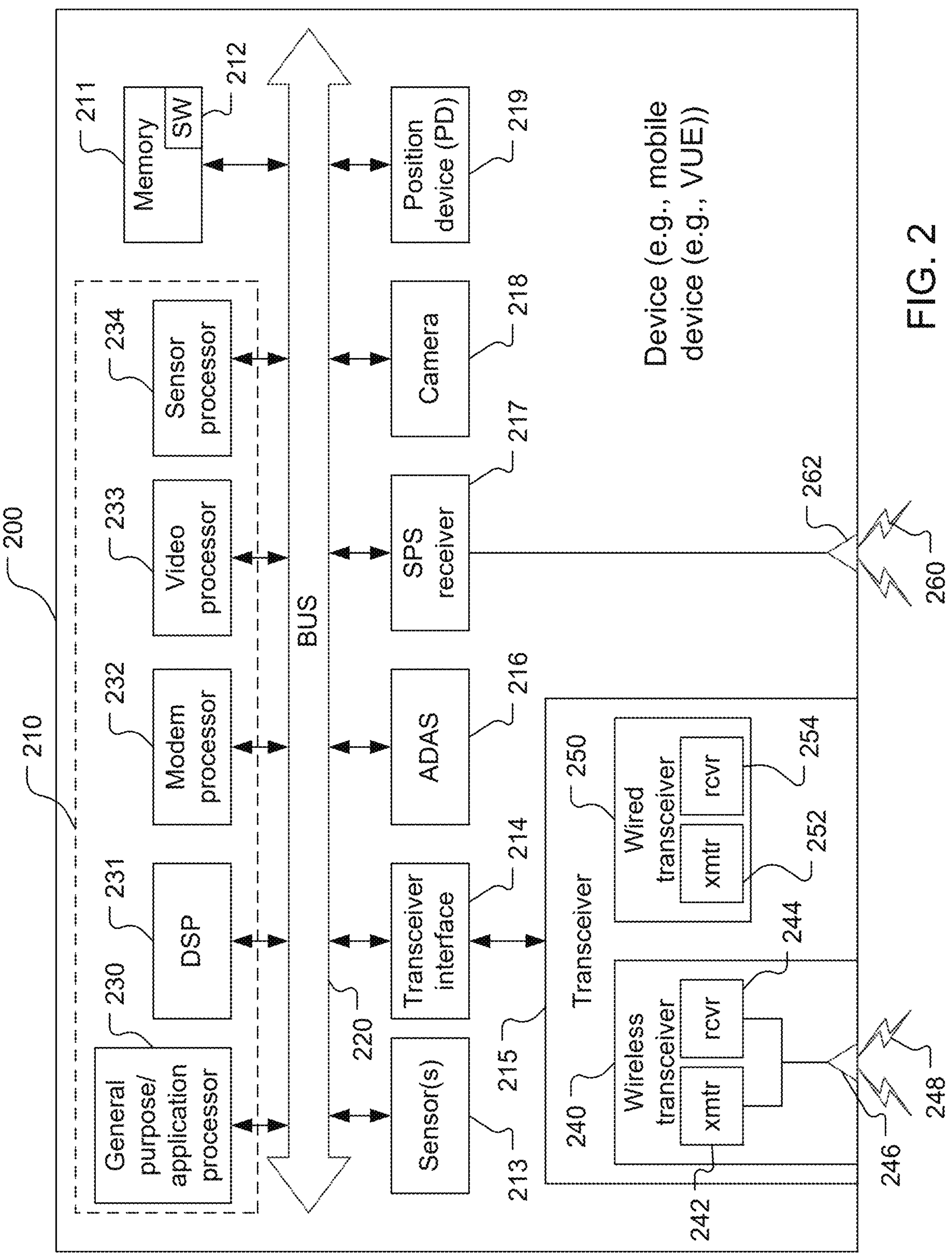
FIG. 2 is a block diagram of components of an example of a user equipment shown in FIG. 1.

Referring also to FIG. 2, a device 200 (which may be a mobile device such as a user equipment (UE) such as a vehicle (VUE)) comprises a computing platform including a processor 210, memory 211 including software (SW) 212, one or more sensors 213, a transceiver interface 214 for a transceiver 215 (that includes a wireless transceiver 240 and a wired transceiver 250), an ADAS 216 (Advanced Driver Assistance System), a Satellite Positioning System (SPS) receiver 217, a camera 218, and a position device (PD) 219. The device 200 may be called a mobile wireless signaling device because the device 200 is configured to transfer (e.g., transmit and/or receive) wireless signals, e.g., wireless communication signals and/or wireless sensing signals. The processor 210, the memory 211, the sensor(s) 213, the transceiver interface 214, the ADAS 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the device 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the device 200 for connectivity. The memory 211 may be a non-transitory, processor-readable storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes instructions of software and/or firmware. The description herein may refer to the processor 210 performing a function as shorthand for one or more of the processors 230-234 performing the function. The description herein may refer to the device 200 performing a function as shorthand for one or more appropriate components of the device 200 performing the function. The processor 210 may include a memory with stored instructions in addition to and/or instead of the memory 211. Functionality of the processor 210 is discussed more fully below.

The configuration of the device 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the ADAS 216, the SPS receiver 217, the camera 218, the PD 219, and/or a wired transceiver.

The device 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The device 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. The sensor(s) 213 may comprise an inertial measurement unit (IMU) that may comprise, for example, one or more accelerometers (e.g., collectively responding to acceleration of the device 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensing sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the device 200 is fixed (stationary) or mobile and/or whether to report certain useful information, e.g., to an LMF (Location Management Function) regarding the mobility of the device 200. For example, based on the information obtained/measured by the sensor(s) 213, the device 200 may notify/report to the LMF that the device 200 has detected movements or that the device 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the device 200, etc.

The IMU may be configured to provide measurements about a direction of motion and/or a speed of motion of the device 200, which may be used in relative location determination. For example, one or more accelerometers and/or one or more gyroscopes of the IMU may detect, respectively, a linear acceleration and a speed of rotation of the device 200. The linear acceleration and speed of rotation measurements of the device 200 may be integrated over time to determine an instantaneous direction of motion as well as a displacement of the device 200. The instantaneous direction of motion and the displacement may be integrated to track a location of the device 200. For example, a reference location of the device 200 may be determined, e.g., using the SPS receiver 217 (and/or by some other means) for a moment in time and measurements from the accelerometer(s) and gyroscope(s) taken after this moment in time may be used in dead reckoning to determine present location of the device 200 based on movement (direction and distance) of the device 200 relative to the reference location.

The magnetometer(s) may determine magnetic field strengths in different directions which may be used to determine orientation of the device 200. For example, the orientation may be used to provide a digital compass for the device 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to guided (e.g., wired electrical and/or optical) signals and from guided (e.g., wired electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi® short-range wireless communication technology, WiFi® Direct (WiFi-D), Bluetooth® short-range wireless communication technology, Zigbee® short-range wireless communication technology, etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with an NG-RAN (Next Generation-Radio Access Network) to send communications to, and receive communications from, the NG-RAN. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The ADAS 216 may perform one or more driving operations per one or more commands. For example, the ADAS 216 may include components to control a throttle, brakes, and a steering mechanism of the device 200, and may respond to one or more commands, e.g., from the processor 210, to control the throttle, brakes, and/or steering mechanism, e.g., to move the device 200 along a trajectory into a driving gap and to sync the device 200 in the driving gap (e.g., maintain the vehicle in a moving driving gap).

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to guided signals, e.g., wired electrical or optical signals, and may be integrated with the antenna 246. The SPS receiver 217 may be configured to process, in whole or in part, the acquired SPS signals 260 for estimating a location of the device 200. For example, the SPS receiver 217 may be configured to determine location of the device 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the device 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the device 200.

The device 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown).

The position device (PD) 219 may be configured to determine a position of the device 200, motion of the device 200, and/or relative position of the device 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the device 200 using terrestrial-based signals (e.g., at least some of the wireless signals 248) for trilateration, for assistance with obtaining and using the SPS signals 260, or both. The PD 219 may be configured to determine location of the device 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the device 200. The PD 219 may be configured to use one or more other techniques (e.g., relying on the UE's self-reported location (e.g., part of the UE's position beacon)) for determining the location of the device 200, and may use a combination of techniques (e.g., SPS and terrestrial positioning signals) to determine the location of the device 200. The PD 219 may include one or more of the sensors 213 (e.g., gyroscope(s), accelerometer(s), magnetometer(s), etc.) that may sense orientation and/or motion of the device 200 and provide indications thereof that the processor 210 (e.g., the general-purpose/application processor 230 and/or the DSP 231) may be configured to use to determine motion (e.g., a velocity vector and/or an acceleration vector) of the device 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the device 200, and may be provided by hardware, software, firmware, or various combinations thereof.

Figure 3:
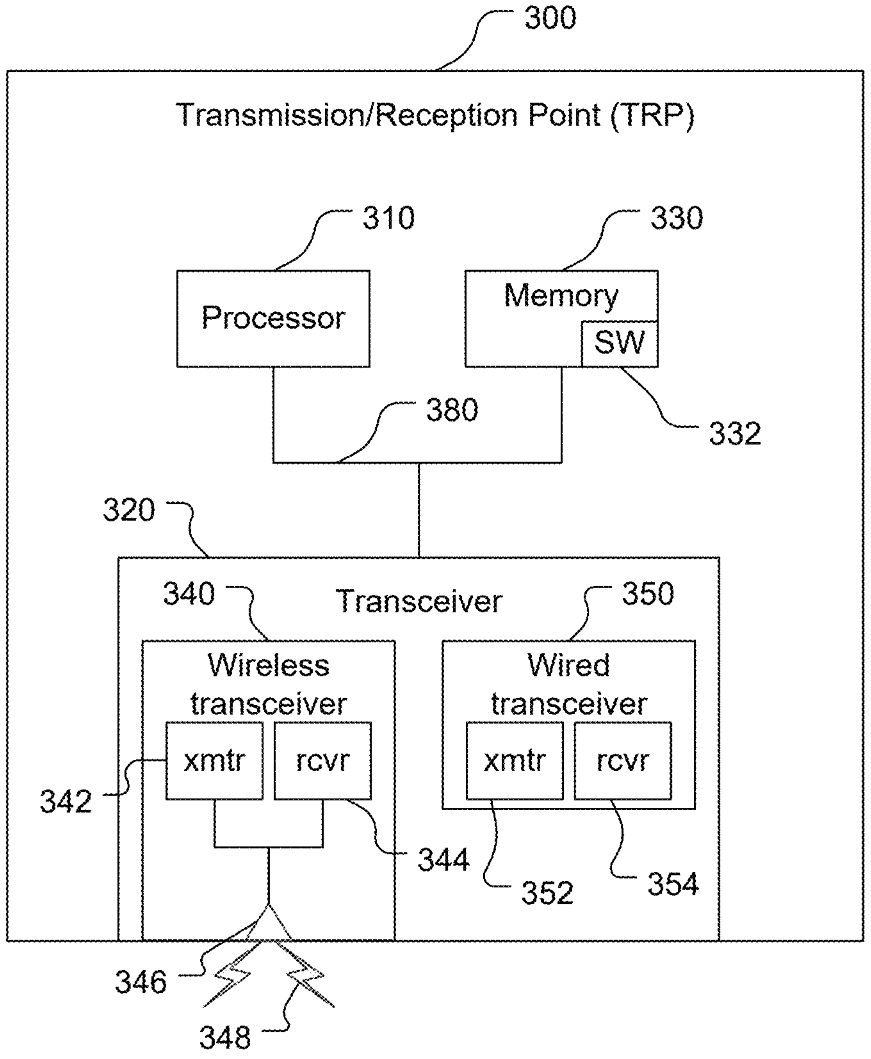
FIG. 3 is a block diagram of components of an example of a transmission/reception point.

Referring also to FIG. 3, an example of a TRP 300 (transmission/reception point) may comprise a computing platform including a processor 310, memory 330 including software (SW) 332, and a transceiver 320. Even if referred to in the singular, the processor 310 may include one or more processors, the transceiver 320 may include one or more transceivers (e.g., one or more transmitters and/or one or more receivers), and/or the memory 330 may include one or more memories. The TRP 300 may comprise, for example, a base station (e.g., a gNB) or a portion of a base station. The processor 310, the memory 330, and the transceiver 320 may be communicatively coupled to each other by a bus 380 (which may be configured, e.g., for optical and/or electrical communication). One or more of the shown apparatus may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 330 may be a non-transitory storage medium that may include random access memory (RAM)), flash memory, disc memory, and/or read-only memory (ROM), etc. The memory 330 may store the software 332 which may be processor-readable, processor-executable software code containing instructions that are configured to, when executed, cause the processor 310 to perform various functions described herein. Alternatively, the software 332 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 330) of the TRP 300 performing the function. The processor 310 may include a memory with stored instructions in addition to and/or instead of the memory 330. Functionality of the processor 310 is discussed more fully below.

The transceiver 320 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to guided (e.g., wired electrical and/or optical) signals and from guided (e.g., wired electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the device 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi® short-range wireless communication technology, WiFi® Direct (WiFi®-D), Bluetooth®, Zigbee®, etc. The wired transceiver 350 may include a wired transmitter 352 and a wired receiver 354 configured for wired communication, e.g., a network interface that may be utilized to communicate with an NG-RAN to send communications to, and receive communications from, an LMF, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by an LMF and/or the device 200 (i.e., an LMF and/or the device 200 may be configured to perform one or more of these functions).

Figure 4:
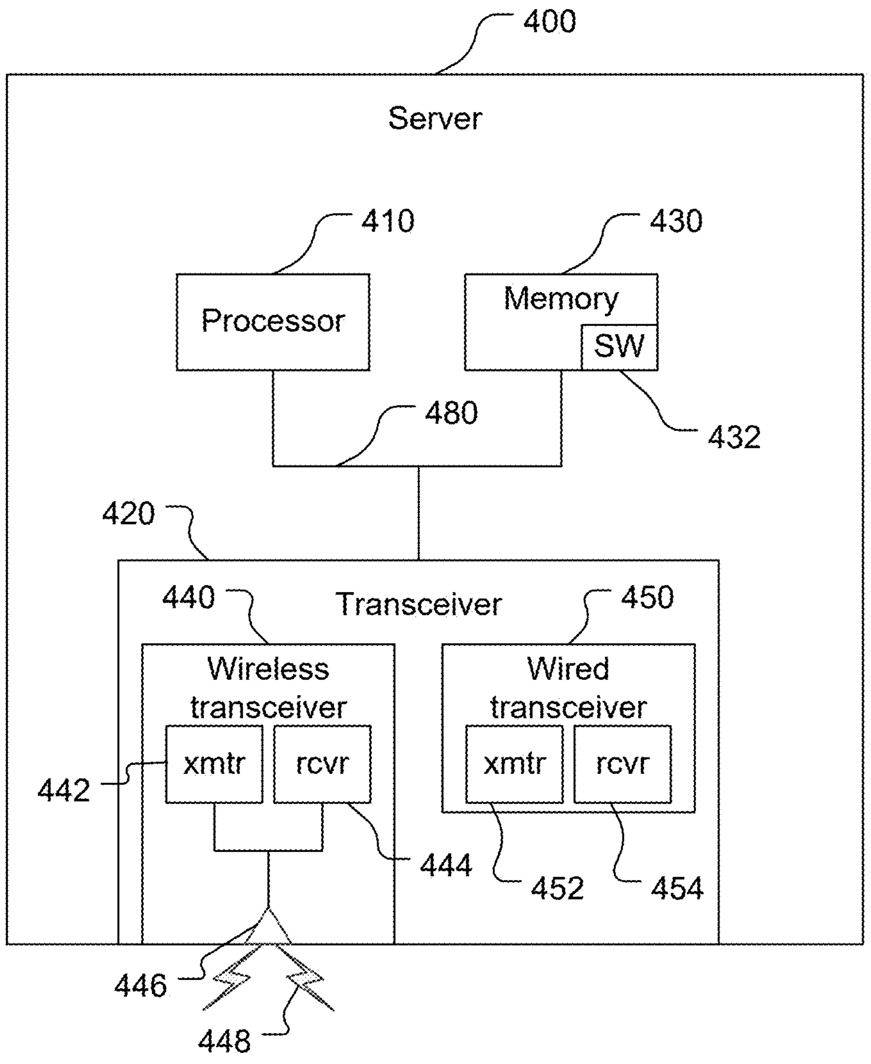
FIG. 4 is a block diagram of components of an example of a server.

Referring also to FIG. 4, a server 400, of which an LMF may be an example, may comprise a computing platform including a processor 410, memory 430 including software (SW) 432, and a transceiver 420. Even if referred to in the singular, the processor 410 may include one or more processors, the transceiver 420 may include one or more transceivers (e.g., one or more transmitters and/or one or more receivers), and/or the memory 430 may include one or more memories. The processor 410, the memory 430, and the transceiver 420 may be communicatively coupled to each other by a bus 480 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 430 may be a non-transitory storage medium that may include random access memory (RAM)), flash memory, disc memory, and/or read-only memory (ROM), etc. The memory 430 may store the software 432 which may be processor-readable, processor-executable software code containing instructions that are configured to, when executed, cause the processor 410 to perform various functions described herein. Alternatively, the software 432 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 430. Functionality of the processor 410 is discussed more fully below.

The transceiver 420 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to guided (e.g., wired electrical and/or optical) signals and from guided (e.g., wired electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the device 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. The wired transceiver 450 may include a wired transmitter 452 and a wired receiver 454 configured for wired communication, e.g., a network interface that may be utilized to communicate with an NG-RAN to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the device 200 (i.e., the TRP 300 and/or the device 200 may be configured to perform one or more of these functions).

Figure 5:
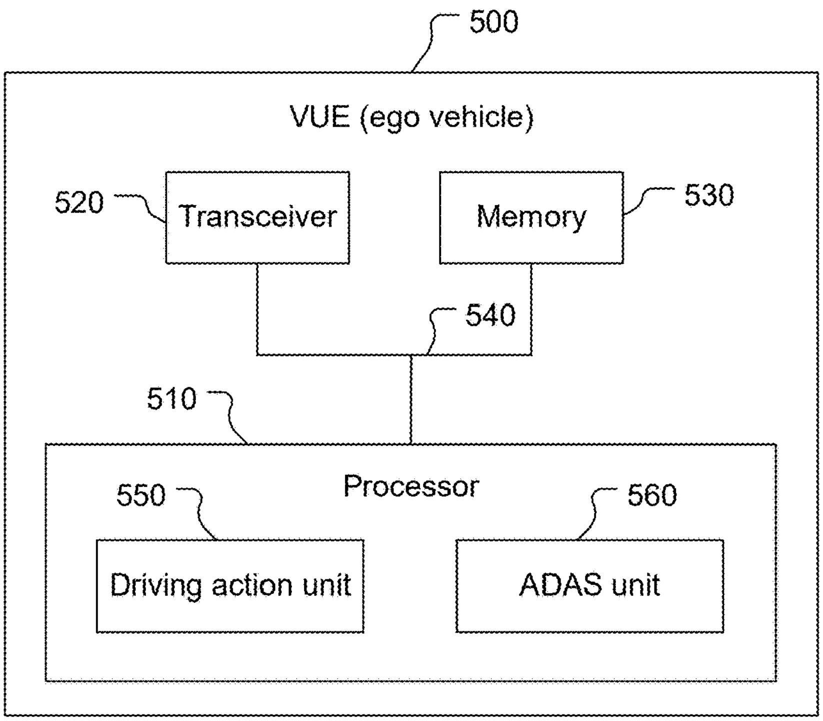
FIG. 5 is a block diagram of an example of a vehicle user equipment.

Referring to FIG. 5, a VUE 500 includes a processor 510, a transceiver 520, and a memory 530 communicatively coupled to each other by a bus 540. The VUE 500 may be, for example, an ego vehicle. Various forms of ego vehicles may be used, e.g., a car, truck, motorcycle, scooter, etc. The disclosure herein focuses on a VUE, but the disclosure herein is applicable to other devices, e.g., non-vehicle devices. Even if referred to in the singular, the processor 510 may include one or more processors, the transceiver 520 may include one or more transceivers (e.g., one or more transmitters and/or one or more receivers), and/or the memory 530 may include one or more memories. The VUE 500 may include the components shown in FIG. 5, and may include one or more other components such as any of those shown in FIG. 2 such that the device 200 may be an example of the VUE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the VUE 500 performing a function as shorthand for one or more appropriate components (e.g., the processor 510 and the memory 530) of the VUE 500 performing the function. The processor 510 (possibly in conjunction with the memory 530 and, as appropriate, the transceiver 520) may include a driving action unit 550 and an ADAS unit 560. The driving action unit 550 and the ADAS unit 560 are discussed further herein, and the description herein may refer to the driving action unit 550 and/or the ADAS unit 560 performing one or more functions, and/or may refer to the processor 510 generally, or the VUE 500 generally, as performing any of the functions of the driving action unit 550 and/or the ADAS unit 560, with the VUE 500 being configured to perform the function(s).

Figure 6:
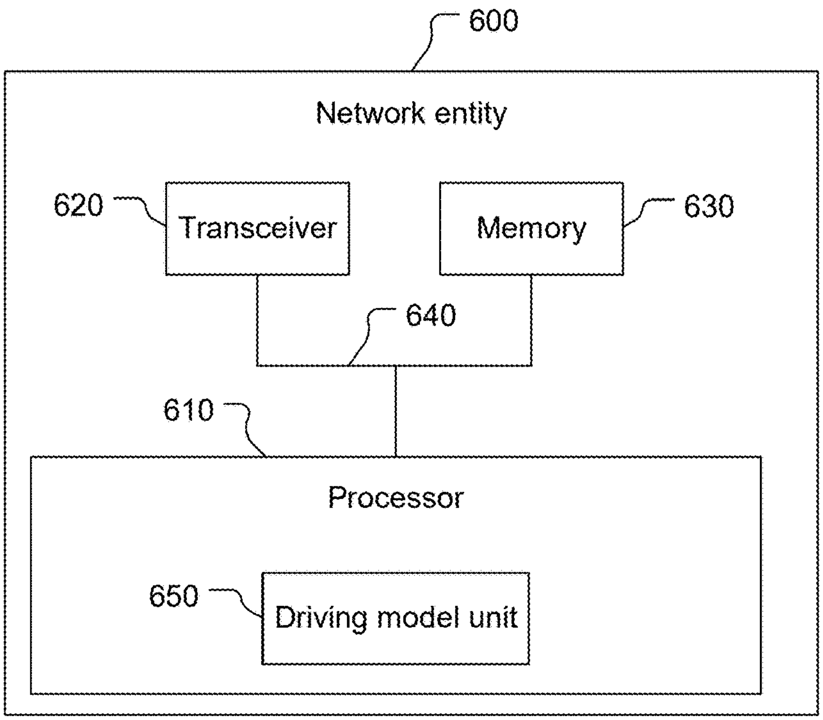
FIG. 6 is a block diagram an example of a network entity.

Referring also to FIG. 6, a network entity 600 includes a processor 610, a transceiver 620, and a memory 630 communicatively coupled to each other by a bus 640. Even if referred to in the singular, the network entity 600 may include one or more network entities, the processor 610 may include one or more processors, the transceiver 620 may include one or more transceivers (e.g., one or more transmitters and/or one or more receivers), and/or the memory 630 may include one or more memories. The network entity 600 may include the components shown in FIG. 6 and may be configured to be a component of a communication network (e.g., a terrestrial communication network such as a cellular network). The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 420. The memory 630 may be configured similarly to the memory 430, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 320. The memory 630 may be configured similarly to the memory 330, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a driving model unit 650. The driving model unit 650 is discussed further herein, and the description herein may refer to the driving model unit 650 performing one or more functions, and/or may refer to the processor 610 generally, or the network entity 600 generally, as performing any of the functions of the driving model unit 650, with the network entity 600 being configured to perform the function(s). While referred to as a driving model unit, the description of the driving model unit 650 may be applicable to guided movement more generally, and not just movement for driving (e.g., by a car, truck, motorcycle, scooter, etc.).

Traffic-rule reasoning is an important aspect of autonomous driving for autonomous driving vehicles (AVs) to navigate safely and efficiently. Traffic-rule reasoning fundamentally influences safety, reliability, and societal perception of AVs. Traffic-rule reasoning is important for traffic flow, with proper adherence to traffic rules allowing for smooth traffic flow and reduced congestion. Further, if AVs strictly follow traffic rules, then the behavior of the AVs is predictable to other vehicles and to persons, e.g., pedestrians. Further, in the event of a collision, if an AV can be shown to have obeyed traffic laws, then the AV manufacturer may avoid responsibility for the collision.

The driving model unit 650 and the driving action unit 550 are configured to implement traffic-rule-based reasoning for autonomous driving (and/or to implement general rule-based reasoning for other autonomous motion). Previous approaches to implementing such reasoning have used a controller to formulate traffic-rule reasoning as a Boolean satisfiability (SAT) problem and to employ a SAT solver like Clasp (also known as Clingo) or CaDiCal. The SAT solver may determine whether a problem is satisfiable and produce a corresponding output, called an answer set. This approach may use an unacceptable amount of time to determine the output, especially in the context of autonomous driving where quick decisions are paramount, and especially where large numbers of variables are considered. For example, SAT solvers may have unbounded runtimes to determine a solution, which may result in unacceptable runtimes even in the presence of a moderate number of (e.g., eight or nine) variables considered (e.g., that define a present driving environment). A real-time SAT solver approach may use dynamic memory allocation (i.e., memory allocated as the SAT solver executes to provide memory that the SAT solver needs to operate). Dynamic memory allocation may not be acceptable, e.g., to automotive standards such as MISRA C++ (Rule 18-4-1) and AUTOSAR C++ (Rule 18-5-5). With most SAT solvers relying on dynamic memory, use of a SAT solver to determine available actions poses impediments to obtaining certification for an autonomous driving system.

Figure 7:
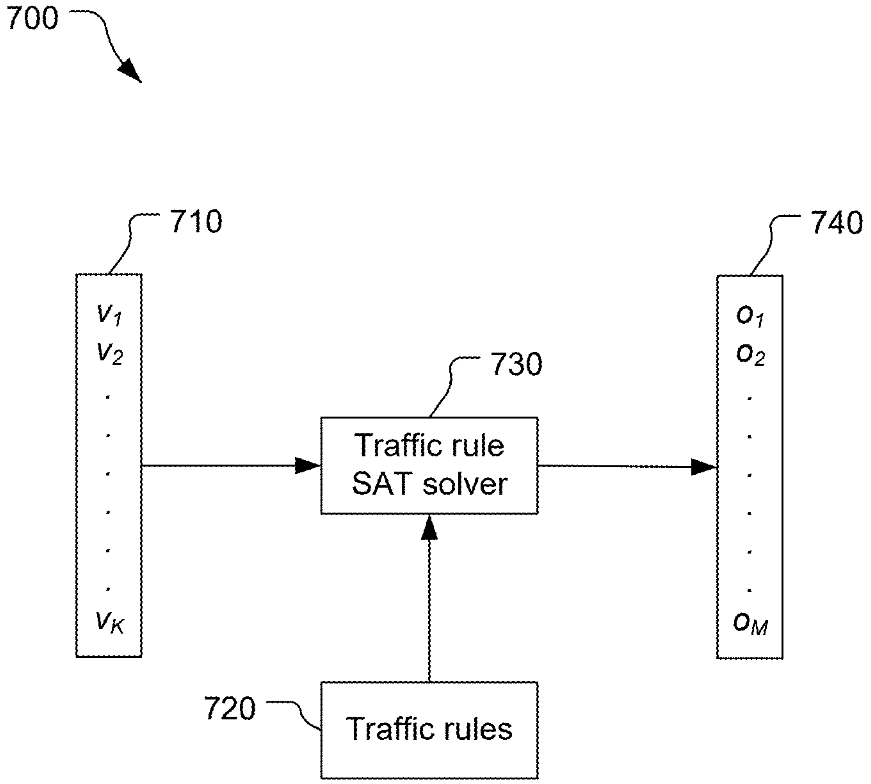
FIG. 7 (Prior art)
FIG. 7 is a block diagram of a prior-art technique of determining an answer set for potential driving actions.

Referring also to FIG. 7, previously, to implement traffic-rule-based reasoning for autonomous driving, one or more available actions have been determined based on a current state of a driving environment, applicable traffic rules, and a SAT solver. For example, in a previous process 700 for determining available driving actions, an input set 710 of variables representing a current state of a driving environment (e.g., presence and state of traffic lights (e.g., red, yellow, green), presence and content of traffic signs, nearby vehicles and motion and/or paths of such vehicles, etc.), and applicable traffic rules 720 are input into a SAT solver 730. The SAT solver 730 outputs an answer set 740 that is a Boolean sequence that indicates whether potential next actions (e.g., proceed, stop, yield, do not yield, turn right, turn left, etc.) are available (e.g., true/false for each potential action). The input set 710 may comprise an input sequence of length K, describing an environment of an ego vehicle, and may be input to the SAT solver 730. The input set 710 may be a Boolean sequence. The SAT solver 730 attempts to solve a SAT problem that is defined based on the input set 710 and the traffic rules 720 (which may be dependent on one or more factors, e.g., region, time of day, etc.). Solving the SAT problem means finding the answer set 740 that satisfies the traffic rules 720 given the environmental conditions indicated by the input set 710. The SAT problem is either satisfiable, meaning that an answer set exists, i.e., there exists a sequence of M outputs ($o_1, o_2, \ldots, o_M$), that satisfies the traffic rules 720 given the input set 710, or is not satisfiable, meaning that there is no answer set that satisfies the traffic rules 720 given the input set 710. If the problem is satisfiable, then the SAT solver 730 outputs an indication that the problem is satisfiable and outputs the answer set 740 that satisfies the problem. The output of the answer set 740 by the SAT solver 730 may be considered to be an implicit indication that the problem is satisfiable. If the problem is not satisfiable, then the SAT solver 730 may provide an indication to that effect and may not output any answer set (or may output a null answer set of M outputs). The value of M may be fixed, e.g., with a downstream operation expecting M outputs to be provided. One or more output values in the answer set 740 may have a default value. For example, an output may have a default value if the value of the output is irrelevant to a present determination (e.g., an output regarding whether to activate a turn indicator when doing so (or not) is irrelevant to a present determination (e.g., whether to activate a horn). The SAT solver 730 used to implement the traffic-rule-based reasoning may have an unbounded runtime and/or use of dynamic memory may be involved to determine the potential next actions. Further, operation of the SAT solver 730 may be difficult to interpret, posing a problem with obtaining certification from a safety regulator.

Figure 8:
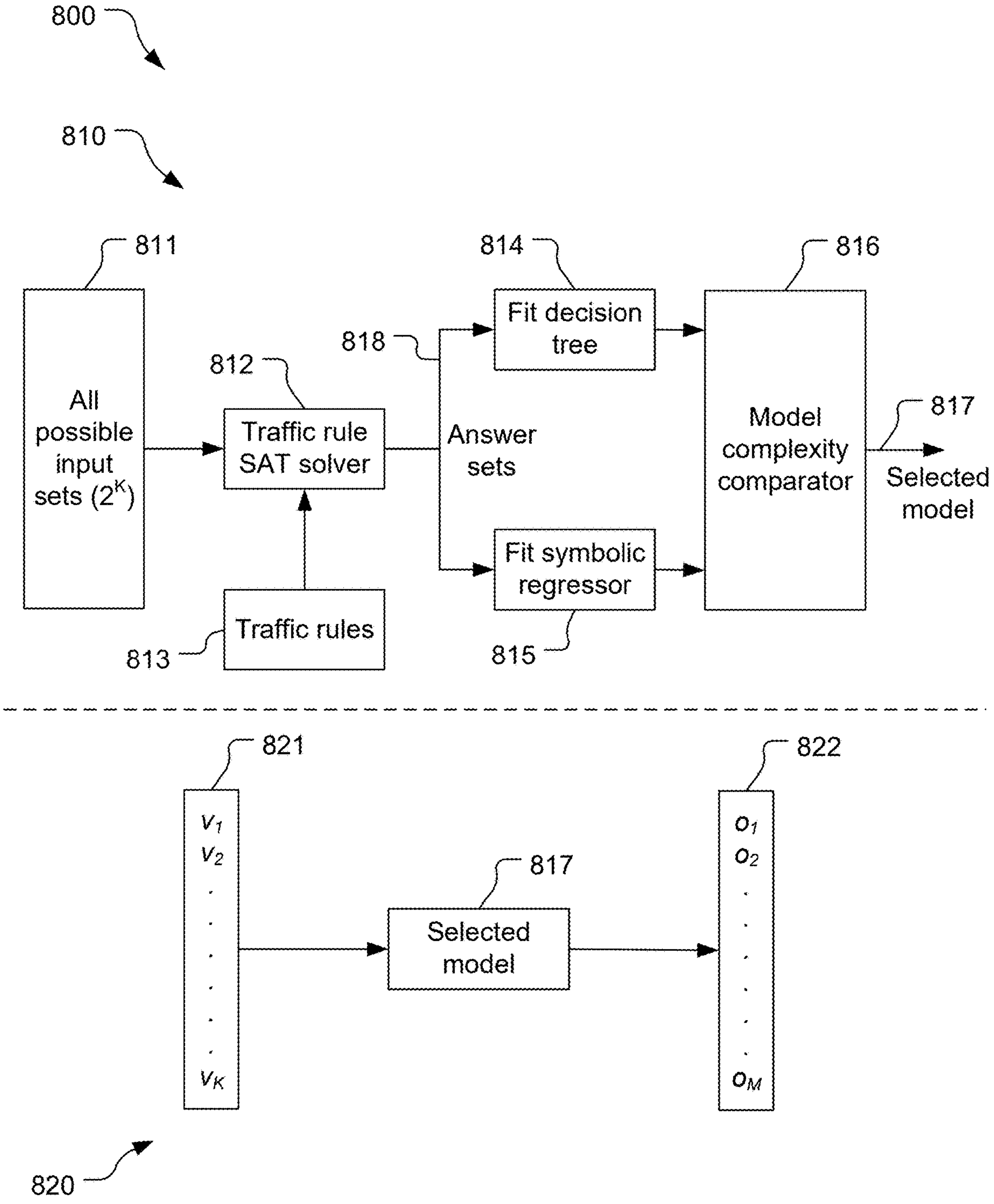
FIG. 8 is a block diagram of an example of a two-phase process for determining a model for determining an answer set of acceptable driving actions and applying the model to determine acceptable driving actions in real time.

Referring to FIG. 8, a two-phase process 800 for determining a model for determining available driving actions and using the model to determine available driving actions in real time is shown. The two-phase process 800 includes an offline phase 810 during which the model for determining available driving actions is determined. In the offline phase 810, time and/or memory allocation may be flexible. The offline phase 810 may be performed, e.g., before manufacture of the VUE 500, and may be repeated over time, e.g., to provide an updated model to the VUE 500. The two-phase process 800 includes an online phase 820 during which the model (determined during the offline phase 810) for determining available driving actions is applied to present environmental conditions to determine available driving actions, which may be used to select a driving action to implement, e.g., by the ADAS unit 560. The offline phase 810 develops a time-bounded, static-memory, traffic-rule model for determining available driving actions from environmental inputs, and the online phase 820 runs the model with current environmental inputs to determine available driving actions in real time (e.g., sufficiently quickly to be used to make useful driving decisions). A time-bounded model has a bounded runtime (maximum time) within which the model can be evaluated. A particular evaluation of the model (e.g., of a decision tree model) may use less than the bounded runtime (in some evaluations), but uses no more than the bounded runtime for any single evaluation of the model. A static-memory model has a known amount of memory that can be allocated before evaluation of the model to enable any evaluation of the model.

In the offline phase 810, the network entity 600, e.g., the driving model unit 650, determines a model, here a time-bounded, static-memory, traffic-rule model for determining available driving actions from environmental inputs. A SAT solver 812 may use all possible input sets 811, of input variables defining driving environments of an ego vehicle, and traffic rules 813 to determine corresponding answers sets 818 (an answer set for each combination of input set and traffic rules). The SAT solver 812 may be allowed to use any amount of time to determine each answer set, and may use dynamic memory to determine each answer set. In the example shown in FIG. 8, the offline phase 810 determines two potential time-bounded, static-memory, traffic-rule models and selects one of the potential models as a selected model 817. Other implementations of the offline phase 810 may be used. For example, an offline phase may be implemented where only one time-bounded, static-memory, traffic-rule model is determined. As another example, an offline phase may be implemented where more than two potential time-bounded, static-memory, traffic-rule models are determined and one of these potential models is selected for real-time use. As another example, an offline phase may be implemented where models for different geographic regions (e.g., countries, states, etc.) are determined and a model may be selected for each region (as opposed to a model being determined for multiple regions, with region being one or more input variables in an input set).

At stage 814, the network entity 600, e.g., the driving model unit 650, may fit a decision tree time-bounded, static-memory, traffic-rule model to the input sets 811, the traffic rules 813, and the answer sets 818. The determined model may be a zero-error model such that for any combination of input set and traffic rules, the model will produce an accurate answer set, without any errors (e.g., without any false positives (falsely indicating that an action is available, e.g., while maintaining safety requirements) or any false negatives (falsely indicating that an action is not available, e.g., while maintaining safety requirements)). The decision tree model is provided to a model complexity comparator 816, e.g., implemented by the driving model unit 650.

Figure 9:
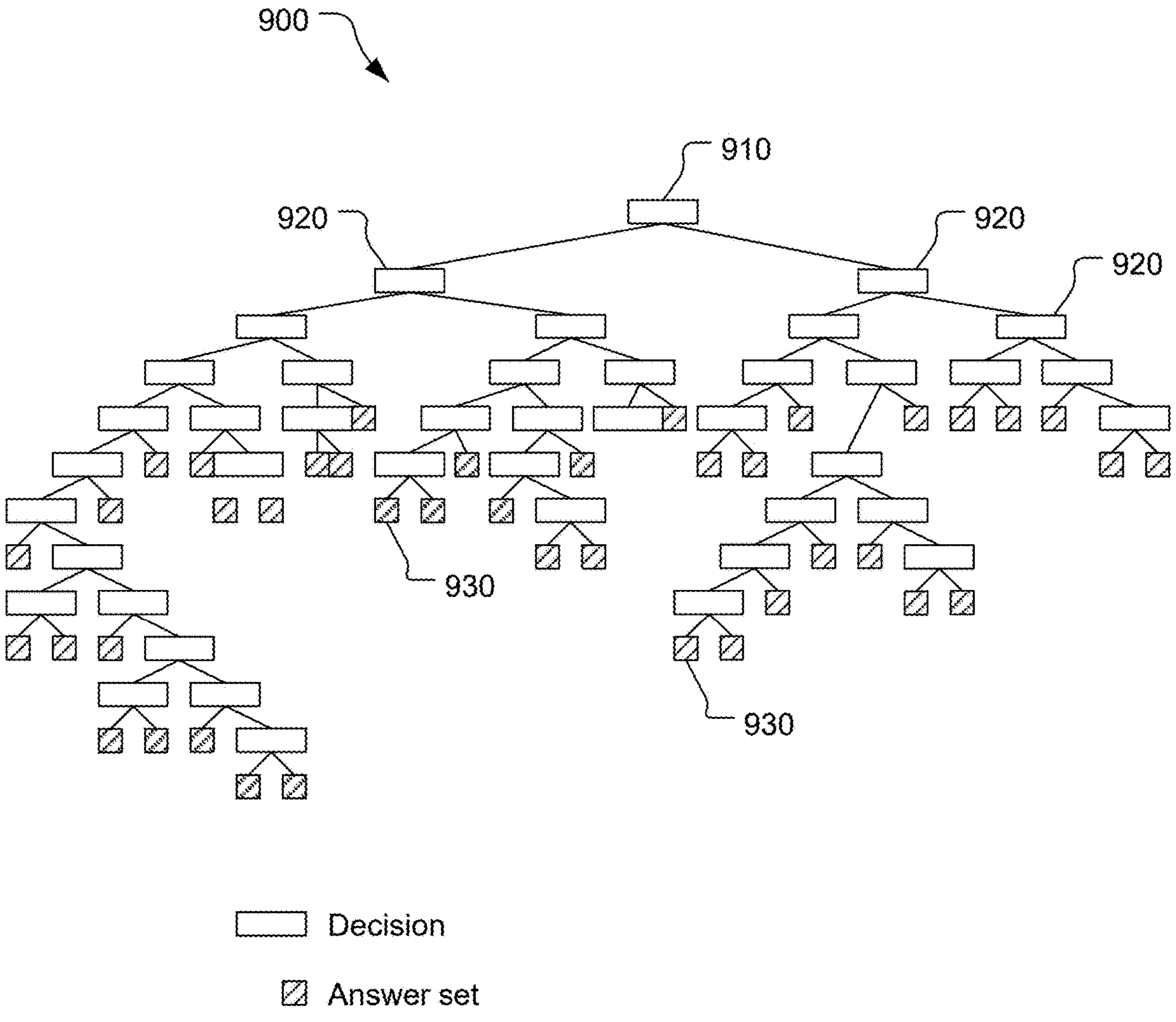
FIG. 9 is a block diagram of an example of a decision-tree model for determining an answer set.

Referring also to FIG. 9, a decision tree 900 is an example of a decision tree model determined at stage 814. The decision tree 900 is a type of machine learning model that may be used for classification and/or regression tasks. The decision tree 900 splits an input space into distinct regions based on values of variables in the input sets 811. The decision tree 900 includes a root decision 910, branch decisions 920, and leaves 930. Each of the decisions 910, 920 defines an inquiry based on one or more inputs (of an input set). Each of the branch decisions 920 is dependent on the result(s) of the previous decision(s) 910, 920. Each of the leaves 930 provides a respective pre-determined answer set. As shown in this example, different evaluations of the decision tree 900 may involve different quantities of decision evaluations (i.e., different branches may have different lengths, i.e., different quantities of decisions) based on the input values in an input set, and thus may take different amounts of time to evaluate and determine the corresponding answer set. For example, fewer decisions may be evaluated if an input value indicates a red light compared to the input value indicating a green light. The decision tree 900 may be fit using, for example, an open-source machine learning library such as the sklearn package (also known as scikit-learn) in Python programming language. Python-trained models may be ported into C++ programming language, for example using a package such as pybind. A decision tree has a bounded runtime given by a depth of the tree and may be evaluated without using dynamic memory. A decision tree may operate as a white box, such that how a result is reached is readily apparent to a lay person (as opposed to a black box where how a result is reached is extremely difficult or impossible to determine even if an algorithm implemented by the black box is known).

Referring again to FIG. 8, at stage 815, the network entity 600, e.g., the driving model unit 650, may fit a symbolic regressor time-bounded, static-memory, traffic-rule model to the input sets 811, the traffic rules 813, and the answer sets 818. The determined model may be a zero-error model such that for any combination of input set and traffic rules, the model will produce an accurate answer set, without any errors (e.g., without any false positives (falsely indicating that an action is available, e.g., while maintaining safety requirements) or any false negatives (falsely indicating that an action is not available, e.g., while maintaining safety requirements)). The symbolic regressor model is provided to the model complexity comparator 816.

Referring also to FIG. 10, a symbolic regression mathematical expression 1000 is an example of a portion of a symbolic regressor model determined at stage 815. In the mathematical expression 1000, variables $X_n$ are the input values of n input variables of an input set. Symbolic regression is a form of regression analysis that uses techniques of genetic programming to identify mathematical expressions that (best) fit a given set of data. Symbolic regression is particularly valuable in a situation where the form of the underlying model is unknown. The symbolic regressor fitting of stage 815 may be performed, e.g., using a gplearn.genetic package in Python. Symbolic regressor fitting may be performed to determine a mathematical expression for each output value in an answer set, or a more complex mathematical expression may be determined to provide the values of all the output values in the answer set. Symbolic regression deployment in C++ may be performed in at least two ways. For example, Python trained models may be ported into C++ with a package such as pybind. As another example, symbolic regression may be deployed in C++ by hardcoding the mathematical expression(s) in a .h file. As with decision trees, a symbolic regression model has a bounded runtime given by a quantity of operations in the mathematical expression(s) of the model, may be evaluated without using dynamic memory, and may operate as a white box. With a symbolic regression mathematical expression, evaluation of each mathematical expression will take the same, or nearly the same, amount of time regardless of the input values in the input set, with the time depending on the quantity of operations in the mathematical expression (with each multiplication, division, addition, or subtraction being an operation).

Returning again to FIG. 8, the model complexity comparator 816 (e.g., of the driving model unit 650) may compare the decision tree model and the symbolic regression model (and any other determined model) to select a model for use by the VUE 500. For example, the comparator 816 may determine the model that has the lower amount of static memory allocation (in order to be evaluated). The comparator 816 outputs the selected model 817, e.g., providing the selecting model 817 to a manufacturer of the VUE 500 and/or transmitting the selected model 817 to the VUE 500. The process 800 may be repeated over time, e.g., to update the selected model 817 in view of traffic rules changes. The comparator 816 may provide an updated model as the selected model 817 and/or one or more indications of one or more changes to a prior selected model in order to form an updated model for use by the VUE 500.

During the online phase 820, the VUE 500, e.g., the driving action unit 550, may apply an input set 821 of input values to the selected model 817 to determine an answer set 822 of output values indicating whether respective driving actions are available or not available. The selected model 817 may cover a range of regions (possibly the entire world) and the input set 821 may include a geographic location value such that regional traffic rules may be factored into the determination of the answer set 822. Alternatively, different selected models may be stored by the VUE 500 and an appropriate region-dependent selected model used based on a present location of the VUE 500 (e.g., as determined by the SPS receiver 217, and/or the sensor(s) 213 (e.g., an IMU), etc.).

The process 800 determines the selected model 817 in the offline phase 810. In this way, SAT solver functions are performed well before real-time driving decisions are to be made. During the online phase 820, the selected model may be applied in a time-bounded, static-memory manner that will typically be shorter than performing the process 700 to determine an answer set because the process 700 is determining the answer set whereas the online phase 820 is essentially a look-up of an answer set that was previously determined. The online phase 820 is also transparent as to how an answer set is derived, facilitating regulator approval and certification of the process 800 for determining available driving actions, and thus facilitating certification of a driving system implementing the process 800 (or at least implementing the online phase 820 based on the process 800).

The process 800 may provide various benefits. For example, a computational time of the process 800 is bounded by a size of a decision tree fit at stage 814 or a number of operations of a symbolic regression fit at stage 815. As another example, automotive standards such as MISRA C++ (Rule 18-4-1) and/or AUTOSAR C++ (Rule 18-5-5) may be satisfied by using the selected model 817 that does not use dynamic memory. The online phase 820 may be less complex than the process 700 in terms of both memory and run time. The process 800 is scalable, being easy to incorporate new rules and/or new inputs. The process 800 may provide more reliable and more robust traffic rule reasoning, which may improve autonomous driving safety, e.g., by helping to ensure appropriate response to a driving environment, e.g., to traffic signals. The process 800 may help provide smoother vehicle behavior (e.g., smoother vehicle maneuvering), e.g., due to more robust relevancy detection enabling path planning and decision making to operate better.

Figure 11:
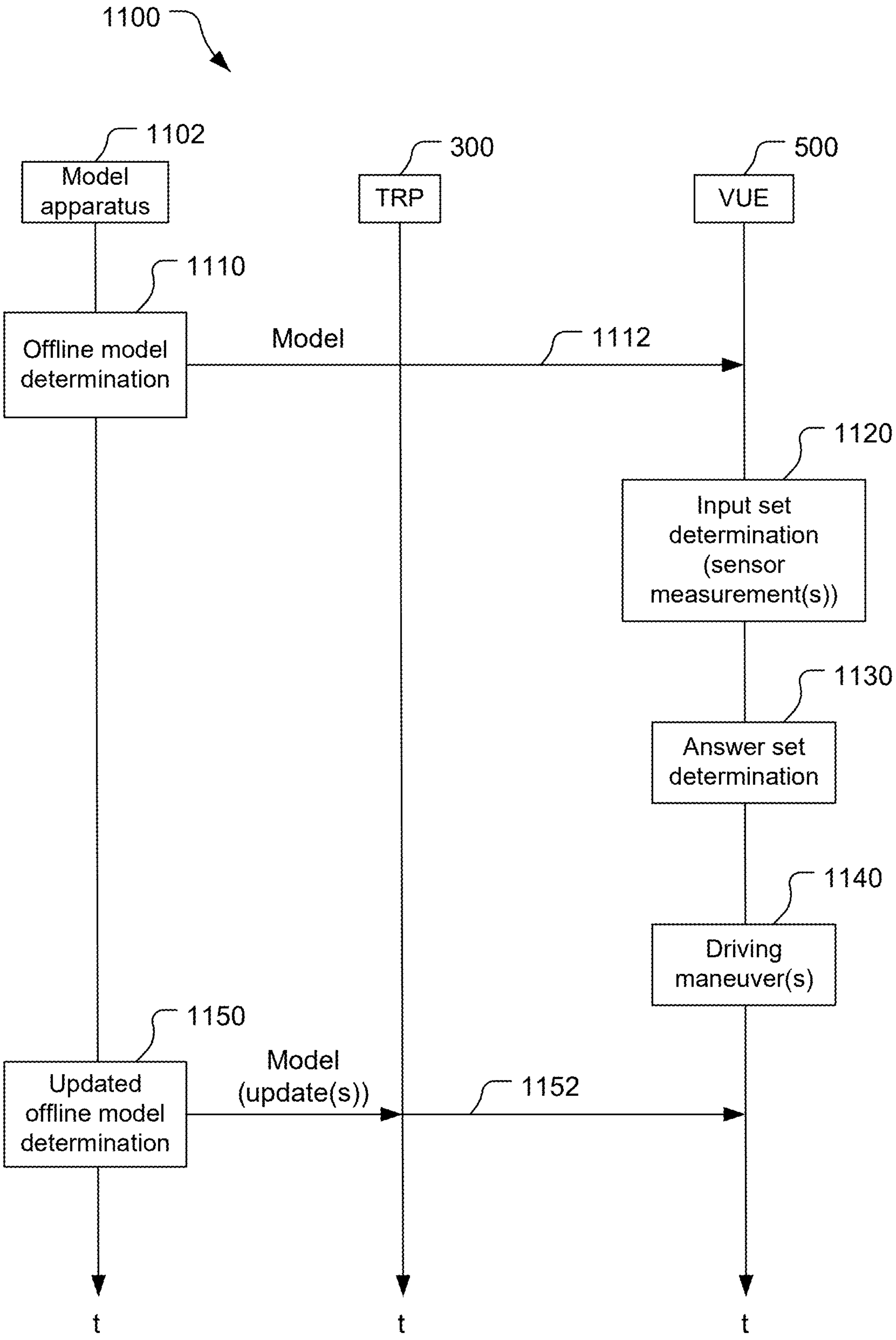
FIG. 11 is a block flow diagram of an example of a signaling and process flow for autonomous driving.

Referring also to FIG. 11, a signal and processing flow 1100 for autonomous driving includes stages shown. The flow 1100 is an example flow and not limiting. The flow 1100 may be altered, e.g., by having one or more messages and/or one or more stages added, removed, rearranged, combined, performed concurrently, and/or having one or more messages and/or one or more stages split into multiple messages and/or stages. Further, the flow 1100 may be applied to applications other than autonomous driving, e.g., other rule-based motion control applications.

At stage 1110, a model apparatus 1102 performs offline model determination. For example, the driving model unit 650 performs the offline phase 810 to determine the selected model 817, in particular a time-bounded, static-memory traffic-rule model for determining an answer set indicating whether various driving actions are available based on an input set indicative of a driving environment, and appropriate traffic rules. The driving model unit 650 provides a model message 1112 indicating the selected model 817 to the VUE 500. For example, driving model unit 650 may transmit the model message 1112 via the transceiver 620 to the VUE 500 (possibly via the TRP 300). As another example, the model apparatus 1102 may be a server or other computing platform, e.g., of a VUE manufacturer, and the model apparatus 1102 may provide the model message 1112 to the VUE 500 as part of programming of the VUE 500 during manufacture, e.g., as part of programming of the memory 530 as part of manufacture of the memory 530 during or before manufacture of the VUE 500 as a whole. The model indicated by the model message 1112 is stored in the VUE 500, e.g., in the memory 530.

At stage 1120, the VUE 500, e.g., the driving action unit 550, obtains an input set characterizing a driving environment of the VUE 500. For example, the VUE 500 uses one or more sensors (e.g., one or more of the sensor(s) 213, and/or the camera 218) to measure values of one or more input variables indicative of the driving environment.

At stage 1130, the VUE 500 determines an answer set based on the input set determined at stage 1120. For example, the VUE 500, e.g., the driving action unit 550, performs the online phase 820 by applying the input set determined at stage 1120 to the model indicated by the model message 1112 to determine an answer set indicative of whether various potential driving actions are available (e.g., acceptable and/or permitted).

At stage 1140, the VUE 500, e.g., the ADAS unit 560, may perform one or more driving maneuvers. For example, the ADAS unit 560 may assess the answer set determined at stage 1130 to determine whether one or more driving maneuvers are available, and if so, which driving maneuver to perform from the one or more permitted driving maneuvers of the answer set.

At stage 1150, the model apparatus 1102 determines an updated model. For example, the network entity 600 performs the offline phase 810 and provides a model update message 1152 to the VUE 500 (e.g., via the transceiver 620) indicative of an updated selected time-bounded, static-memory, traffic-rule model. The model update message 1152 may be provided directly from the model apparatus 1102 to the VUE 500 and/or via one or more intermediary devices, e.g., the TRP 300 as shown in FIG. 11. The model apparatus 1102 may be a network entity to provide the model update message 1152 to the VUE 500. The model update message 1152 may indicate the updated model as a whole and/or may indicate the change(s) to a previous model (e.g., a most-recently provided model) in order to form the updated model. The flow 1100 may return to stage 1120 for further determination of the input set and subsequently the answer data set. Stages 1120, 1130, 1140 may be repeated, e.g., at a rate of 60 Hz, to provide real-time, safe autonomous driving based on real-time environment information.

Figure 12:
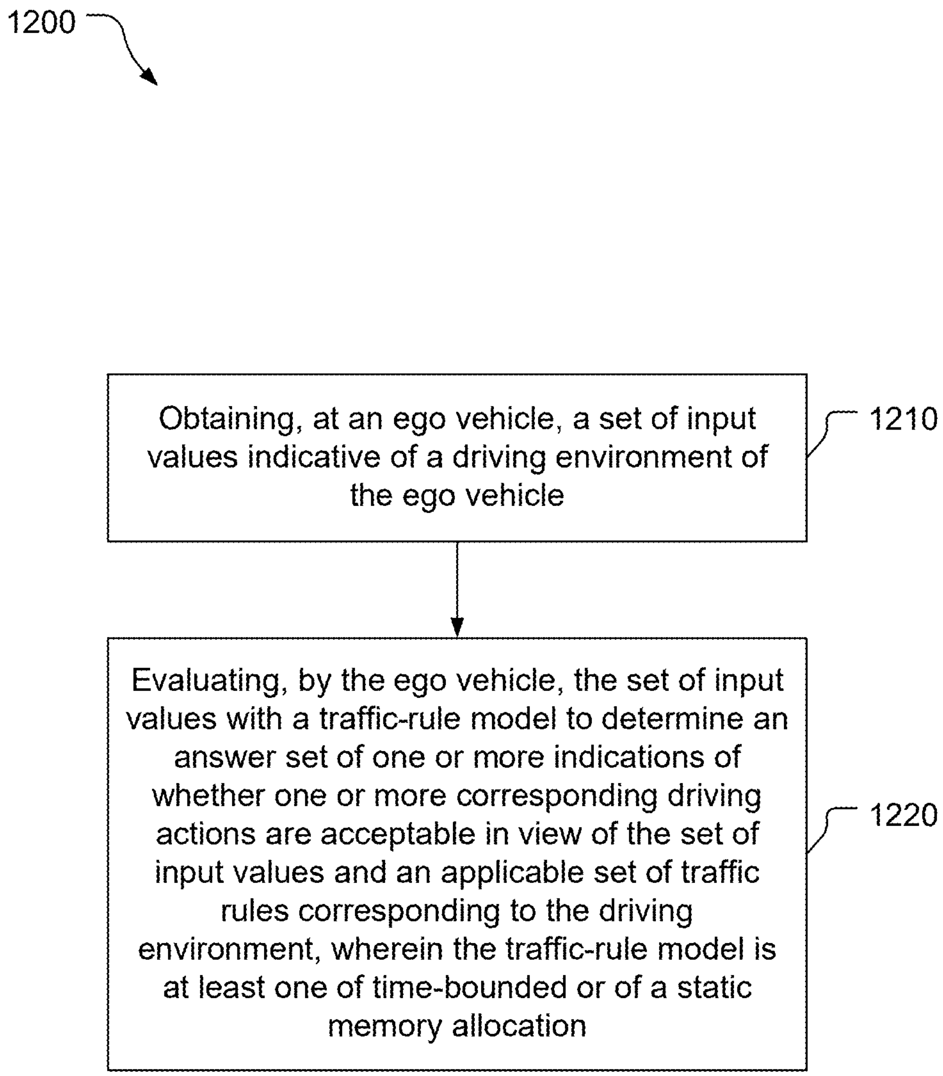
FIG. 12 is a block flow diagram of an example of a method of determining acceptable actions for autonomous driving.

Referring to FIG. 12, with further reference to FIGS. 1-11, a method 1200 of determining acceptable actions for autonomous driving includes the stages shown. The method 1200 is, however, an example only and not limiting. The method 1200 may be altered, e.g., by having one or more stages added, removed, rearranged, combined, performed concurrently, and/or by having one or more single stages split into multiple stages.

At stage 1210, the method 1200 includes obtaining, at an ego vehicle, a set of input values indicative of a driving environment of the ego vehicle. For example, at stage 1120, the VUE 500 may receive and/or determine input values of an input set, e.g., by using one or more sensors to make measurements of a driving environment. Input values are indicative of the environment, e.g., indicating presence and state of traffic lights (e.g., red, yellow, green), presence and content of traffic signs, nearby vehicles and motion and/or paths of such vehicles, etc. The processor 510, possibly in combination with the memory 530, possibly in combination with the transceiver 520 (e.g., the wireless receiver 244 and the antenna 246, and/or the wired receiver 254) and/or possibly in combination with one or more sensors (e.g., of the sensor(s) 213 and/or the camera 218) may comprise means for obtaining the set of input values.

At stage 1220, the method 1200 includes evaluating, by the ego vehicle, the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation. For example, at stage 1130 the VUE 500 may evaluate the selected model 817 in the online phase 820 using the set of input values to determine an answer set. The processor 510, possibly in combination with the memory 530, may comprise means for evaluating the set on input values to determine the answer set.

Implementations of the method 1200 may include one or more of the following features. In an example implementation, the traffic-rule model is both time-bounded and has a static memory allocation. In another example implementation, the traffic-rule model comprises a decision tree. In another example implementation, the traffic-rule model comprises a symbolic regression model. In a further example implementation, evaluating the set of input values with the traffic-rule model comprises evaluating a respective symbolic regression model mathematical expression for each of the one or more indications, of the answer set, of whether the one or more corresponding driving actions are acceptable. For example, the VUE 500 may evaluate a respective mathematical expression, e.g., an example of which is shown in FIG. 10, to determine each output value of the answer set. The processor 510, possibly in combination with the memory 530, may comprise means for evaluating the respective symbolic regression model mathematical expression.

Also or alternatively, implementations of the method 1200 may include one or more of the following features. In an example implementation, the method 1200 includes updating the traffic-rule model based on model update information received by the ego vehicle from a network entity. For example, at stage 1150, the VUE 500 may update a stored model based on the model update message 1152 received from the model apparatus 1102, possibly via the TRP 300.

Figure 13:
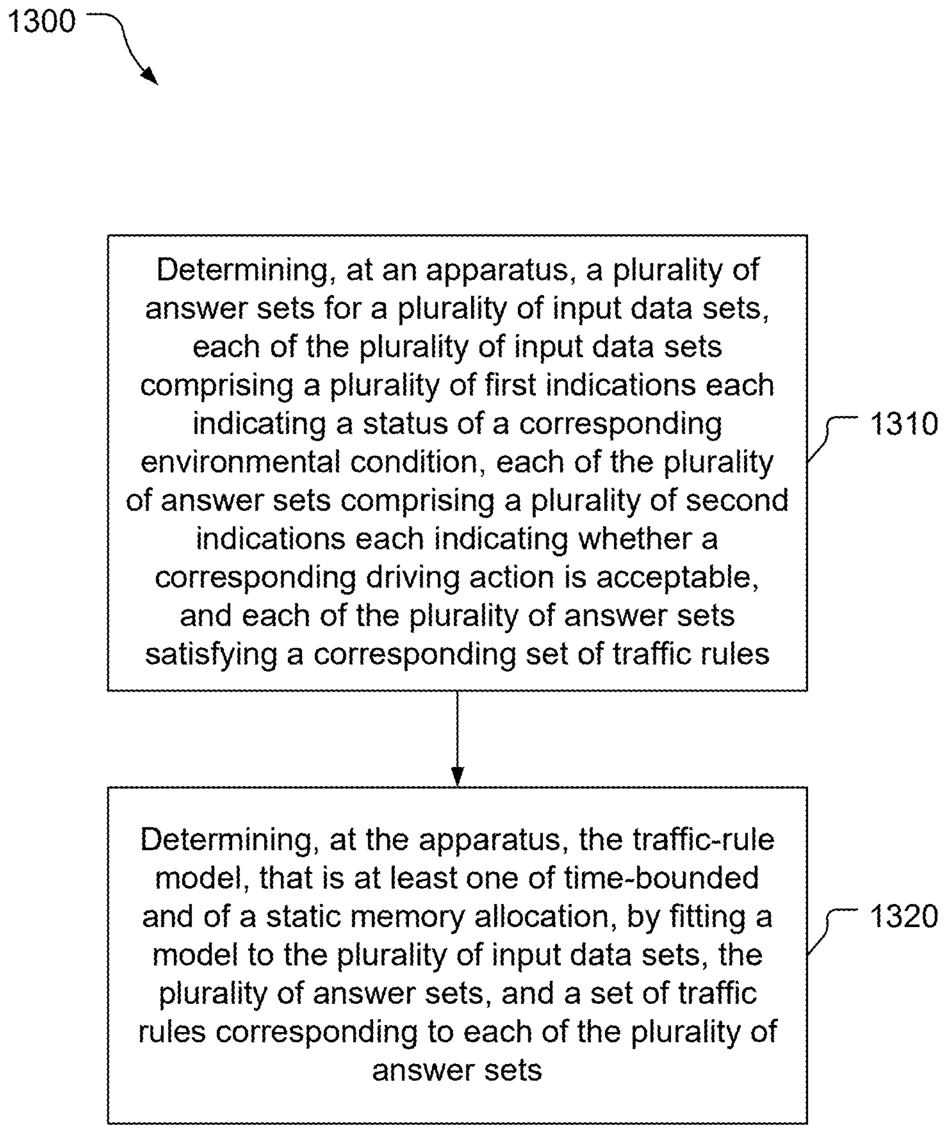
FIG. 13 is a block flow diagram of an example of a method of establishing a traffic-rule model for autonomous driving.

Referring to FIG. 13, with further reference to FIGS. 1-11, a method 1300 of establishing a traffic-rule model for autonomous driving includes the stages shown. The method 1300 is, however, an example only and not limiting. The method 1300 may be altered, e.g., by having one or more stages added, removed, rearranged, combined, performed concurrently, and/or by having one or more single stages split into multiple stages.

At stage 1310, the method 1300 includes determining, at an apparatus, a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules. For example, at stage 1110, the model apparatus 1102 (e.g., the driving model unit 650 of the network entity 600 or of another entity) may perform at least a portion of the offline phase 810 of the process 800, e.g., to determine answer sets using the traffic rule SAT solver 812 based on the input sets 811 and the traffic rules 813. The processor 610, possibly in combination with the memory 630, possibly in combination with the transceiver 620 (e.g., the wireless receiver 444 and the antenna 446, and/or the wired receiver 454, e.g., to receive the traffic rules 813) may comprise means for determining the plurality of answer sets.

At stage 1320, the method 1300 includes determining, at the apparatus, the traffic-rule model, that is at least one of time-bounded and of a static memory allocation, by fitting a model to the plurality of input data sets, the plurality of answer sets, and a set of traffic rules corresponding to each of the plurality of answer sets. For example, at stage 1110, the model apparatus 1102 (e.g., the driving model unit 650 of the network entity 600 or of another entity) may perform at least a portion of the offline phase 810 of the process 800, e.g., to determine one or more models by fitting the model(s) to the input sets 811, the traffic rules 813, and the answer sets 818 produced by the traffic rule SAT solver 812. The processor 610, possibly in combination with the memory 630, may comprise means for determining the traffic-rule model.

Implementations of the method 1300 may include one or more of the following features. In an example implementation, determining the traffic-rule model comprises determining the traffic-rule model to be both time-bounded and of static memory allocation. For example, at stage 1110, the model apparatus 1102 may implement at least a portion of the online phase 810 to fit the input sets 811, the traffic rules 813, and the answer sets 818 to one or more models that are each time bounded and have static memory allocations, e.g., a decision tree model and/or a symbolic regression model. In another example implementation, the traffic-rule model is a selected traffic-rule model, and determining the selected traffic-rule model includes: determining a first potential traffic-rule model by fitting a first model to the plurality of input data sets, the plurality of answer sets, and the set of traffic rules corresponding to each of the plurality of answer sets; determining a second potential traffic-rule model by fitting a second model to the plurality of input data sets, the plurality of answer sets, and the set of traffic rules corresponding to each of the plurality of answer sets; and selecting one of the first potential traffic-rule model and the second potential traffic-rule model as the selected traffic-rule model. For example, at stage 1110, the model apparatus 1102 may implement stages 814, 815, and may implement the model complexity comparator 816 of the online phase 810 to determine two potential traffic-rule models (in the example of the online phase 810, a decision-tree model and a symbolic regression model), and to select one of the models determined at stages 814, 815. The processor 610, possibly in combination with the memory 630, may comprise means for determining the first potential traffic-rule model, means for determining the second potential traffic-rule model, and means for selecting one of the first potential traffic-rule model and the second potential traffic-rule model as the selected traffic-rule model. In a further example implementation, selecting one of the first potential traffic-rule model and the second potential traffic-rule model as the selected traffic-rule model comprises selecting as the selected traffic-rule model the model, of the first potential traffic-rule model and the second potential traffic-rule model, that has a lower corresponding static memory allocation.

Also or alternatively, implementations of the method 1300 may include one or more of the following features. In an example implementation, the method 1300 includes transmitting, from the apparatus to an ego vehicle, the traffic-rule model. For example, at stage 1110, the model apparatus may transmit, e.g., via the transceiver 620, the traffic-rule model to the VUE 500. Alternatively, the traffic-rule model may be determined by the VUE 500. The processor 610, possibly in combination with the memory 630, possibly in combination with the transceiver 620 (e.g., the wireless transmitter 442 and the antenna 446, and/or the wired transmitter 452) may comprise means for transmitting the traffic-rule model. In another example implementation, the method 1300 includes transmitting, from the apparatus to an ego vehicle, traffic-model update information for updating the traffic-rule model. For example, at stage 1150, the model apparatus may transmit, e.g., via the transceiver 620, the model update message 1152 to the VUE 500. The processor 610, possibly in combination with the memory 630, possibly in combination with the transceiver 620 (e.g., the wireless transmitter 442 and the antenna 446, and/or the wired transmitter 452) may comprise means for transmitting the traffic-model update information. In another example implementation, determining the plurality of answer sets for the plurality of input data sets comprises applying a satisfiability solver to each of the plurality of input data sets. For example, the model apparatus 1102 may implement the traffic rule SAT solver 812 to determine the answer sets 818. The processor 610, possibly in combination with the memory 630, may comprise means for applying the satisfiability solver to each of the plurality of input data sets.

IMPLEMENTATION EXAMPLES

Implementation examples are provided in the following numbered clauses.

Clause 1. A method of determining acceptable actions for autonomous driving, the method comprising:

obtaining, at an ego vehicle, a set of input values indicative of a driving environment of the ego vehicle; and evaluating, by the ego vehicle, the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

Clause 2. The method of clause 1, wherein the traffic-rule model is both time-bounded and has a static memory allocation.

Clause 3. The method of either clause 1 or clause 2, wherein the traffic-rule model comprises a decision tree.

Clause 4. The method of either clause 1 or clause 2, wherein the traffic-rule model comprises a symbolic regression model.

Clause 5. The method of clause 4, wherein evaluating the set of input values with the traffic-rule model comprises evaluating a respective symbolic regression model mathematical expression for each of the one or more indications, of the answer set, of whether the one or more corresponding driving actions are acceptable.

Clause 6. The method of any of clauses 1-5, further comprising updating the traffic-rule model based on model update information received by the ego vehicle from a network entity.

Clause 7. An ego vehicle comprising:

at least one transceiver;

at least one memory; and at least one processor communicatively coupled to the at least one transceiver and the at least one memory and configured to:

obtain a set of input values indicative of a driving environment of the ego vehicle; and evaluate the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

Clause 8. The ego vehicle of clause 7, wherein the traffic-rule model is both time-bounded and has a static memory allocation.

Clause 9. The ego vehicle of either clause 7 or clause 8, wherein the traffic-rule model comprises a decision tree.

Clause 10. The ego vehicle of either clause 7 or clause 8, wherein the traffic-rule model comprises a symbolic regression model.

Clause 11. The ego vehicle of clause 10, wherein to evaluate the set of input values with the traffic-rule model the at least one processor is configured to evaluate a respective symbolic regression model mathematical expression for each of the one or more indications, of the answer set, of whether the one or more corresponding driving actions are acceptable.

Clause 12. The ego vehicle of any of clauses 7-11, wherein the at least one processor is configured to update the traffic-rule model based on model update information received via the at least one transceiver from a network entity.

Clause 13. An ego vehicle comprising:

means for obtaining a set of input values indicative of a driving environment of the ego vehicle; and means for evaluating the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

Clause 14. The ego vehicle of clause 13, wherein the traffic-rule model is both time-bounded and has a static memory allocation.

Clause 15. The ego vehicle of either clause 13 or clause 14, wherein the traffic-rule model comprises a decision tree.

Clause 16. The ego vehicle of either clause 13 or clause 14, wherein the traffic-rule model comprises a symbolic regression model.

Clause 17. The ego vehicle of clause 16, wherein the means for evaluating the set of input values with the traffic-rule model comprise means for evaluating a respective symbolic regression model mathematical expression for each of the one or more indications, of the answer set, of whether the one or more corresponding driving actions are acceptable.

Clause 18. The ego vehicle of any of clauses 13-17, further comprising means for updating the traffic-rule model based on model update information received by the ego vehicle from a network entity.

Clause 19. A non-transitory, processor-readable storage medium comprising processor-readable instructions to cause at least one processor of an ego vehicle to:

obtain a set of input values indicative of a driving environment of the ego vehicle; and evaluate the set of input values with a traffic-rule model to determine an answer set of one or more indications of whether one or more corresponding driving actions are acceptable in view of the set of input values and an applicable set of traffic rules corresponding to the driving environment, wherein the traffic-rule model is at least one of time-bounded or of a static memory allocation.

Clause 20. The non-transitory, processor-readable storage medium of clause 19, wherein the traffic-rule model is both time-bounded and has a static memory allocation.

Clause 21. The non-transitory, processor-readable storage medium of either clause 19 or clause 20, wherein the traffic-rule model comprises a decision tree.

Clause 22. The non-transitory, processor-readable storage medium of either clause 19 or clause 20, wherein the traffic-rule model comprises a symbolic regression model.

Clause 23. The non-transitory, processor-readable storage medium of clause 22, wherein the processor-readable instructions to cause the at least one processor to evaluate the set of input values with the traffic-rule model comprise processor-readable instructions to cause the at least one processor to evaluate a respective symbolic regression model mathematical expression for each of the one or more indications, of the answer set, of whether the one or more corresponding driving actions are acceptable.

Clause 24. The non-transitory, processor-readable storage medium of any of clauses 19-23, further comprising processor-readable instructions to cause the at least one processor to update the traffic-rule model based on model update information received by the ego vehicle from a network entity.

Clause 25. A method of establishing a traffic-rule model for autonomous driving, the method comprising:

determining, at an apparatus, a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determining, at the apparatus, a traffic-rule model, that is at least one of time-bounded and of a static memory allocation, by fitting a model to the plurality of input data sets, the plurality of answer sets, and a set of traffic rules corresponding to each of the plurality of answer sets.

Clause 26. The method of clause 25, wherein determining the traffic-rule model comprises determining the traffic-rule model to be both time-bounded and of static memory allocation.

Clause 27. The method of either clause 25 or clause 26, wherein the traffic-rule model is a selected traffic-rule model, and wherein determining the selected traffic-rule model comprises:

determining a first potential traffic-rule model by fitting a first model to the plurality of input data sets, the plurality of answer sets, and the set of traffic rules corresponding to each of the plurality of answer sets;

determining a second potential traffic-rule model by fitting a second model to the plurality of input data sets, the plurality of answer sets, and the set of traffic rules corresponding to each of the plurality of answer sets; and selecting one of the first potential traffic-rule model and the second potential traffic-rule model as the selected traffic-rule model.

Clause 28. The method of clause 27, wherein selecting one of the first potential traffic-rule model and the second potential traffic-rule model as the selected traffic-rule model comprises selecting as the selected traffic-rule model the model, of the first potential traffic-rule model and the second potential traffic-rule model, that has a lower corresponding static memory allocation.

Clause 29. The method of any of clauses 25-28, further comprising transmitting, from the apparatus to an ego vehicle, the traffic-rule model.

Clause 30. The method of any of clauses 25-29, further comprising transmitting, from the apparatus to an ego vehicle, traffic-model update information for updating the traffic-rule model.

Clause 31. The method of any of clauses 25-30, wherein determining the plurality of answer sets for the plurality of input data sets comprises applying a satisfiability solver to each of the plurality of input data sets.

Clause 32. An apparatus comprising:

at least one memory; and at least one processor communicatively coupled to the at least one memory and configured to:

determine a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determine a traffic-rule model, that is at least one of time-bounded and of a static memory allocation, by fitting a model to the plurality of input data sets, the plurality of answer sets, and a set of traffic rules corresponding to each of the plurality of answer sets.

Clause 33. The apparatus of clause 32, wherein to determine the traffic-rule model the at least one processor is configured to determine the traffic-rule model to be both time-bounded and of static memory allocation.

Clause 34. The apparatus of either clause 32 or clause 33, wherein the traffic-rule model is a selected traffic-rule model, and wherein to determine the selected traffic-rule model the at least one processor is configured to:

determine a first potential traffic-rule model by fitting a first model to the plurality of input data sets, the plurality of answer sets, and the set of traffic rules corresponding to each of the plurality of answer sets;

determine a second potential traffic-rule model by fitting a second model to the plurality of input data sets, the plurality of answer sets, and the set of traffic rules corresponding to each of the plurality of answer sets; and select one of the first potential traffic-rule model and the second potential traffic-rule model as the selected traffic-rule model.

Clause 35. The apparatus of clause 34, wherein to select one of the first potential traffic-rule model and the second potential traffic-rule model as the selected traffic-rule model the at least one processor is configured to select as the selected traffic-rule model the model, of the first potential traffic-rule model and the second potential traffic-rule model, that has a lower corresponding static memory allocation.

Clause 36. The apparatus of any of clauses 32-35, further comprising at least one transceiver communicatively coupled to the at least one processor, wherein the at least one processor is configured to transmit, via the at least one transceiver to an ego vehicle, the traffic-rule model.

Clause 37. The apparatus of any of clauses 32-36, further comprising at least one transceiver communicatively coupled to the at least one processor, wherein the at least one processor is configured to transmit, via the at least one transceiver to an ego vehicle, traffic-model update information for updating the traffic-rule model.

Clause 38. The apparatus of any of clauses 32-37, wherein to determine the plurality of answer sets for the plurality of input data sets the at least one processor is configured to apply a satisfiability solver to each of the plurality of input data sets.

Clause 39. An apparatus comprising:

means for determining a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and means for determining a traffic-rule model, that is at least one of time-bounded and of a static memory allocation, by fitting a model to the plurality of input data sets, the plurality of answer sets, and a set of traffic rules corresponding to each of the plurality of answer sets.

Clause 40. The apparatus of clause 39, wherein the means for determining the traffic-rule model comprise means for determining the traffic-rule model to be both time-bounded and of static memory allocation.

Clause 41. The apparatus of either clause 39 or clause 40, wherein the traffic-rule model is a selected traffic-rule model, and wherein the means for determining the selected traffic-rule model comprise:

means for determining a first potential traffic-rule model by fitting a first model to the plurality of input data sets, the plurality of answer sets, and the set of traffic rules corresponding to each of the plurality of answer sets;

means for determining a second potential traffic-rule model by fitting a second model to the plurality of input data sets, the plurality of answer sets, and the set of traffic rules corresponding to each of the plurality of answer sets; and means for selecting one of the first potential traffic-rule model and the second potential traffic-rule model as the selected traffic-rule model.

Clause 42. The apparatus of clause 41, wherein the means for selecting one of the first potential traffic-rule model and the second potential traffic-rule model as the selected traffic-rule model comprise means for selecting as the selected traffic-rule model the model, of the first potential traffic-rule model and the second potential traffic-rule model, that has a lower corresponding static memory allocation.

Clause 43. The apparatus of any of clauses 39-42, further comprising means for transmitting, to an ego vehicle, the traffic-rule model.

Clause 44. The apparatus of any of clauses 39-43, further comprising means for transmitting, to an ego vehicle, traffic-model update information for updating the traffic-rule model.

Clause 45. The apparatus of any of clauses 39-44, wherein the means for determining the plurality of answer sets for the plurality of input data sets comprise means for applying a satisfiability solver to each of the plurality of input data sets.

Clause 46. A non-transitory, processor-readable storage medium comprising processor-readable instructions to cause at least one processor of an apparatus to:

determine a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules; and determine a traffic-rule model, that is at least one of time-bounded and of a static memory allocation, by fitting a model to the plurality of input data sets, the plurality of answer sets, and a set of traffic rules corresponding to each of the plurality of answer sets.

Clause 47. The non-transitory, processor-readable storage medium of clause 46, wherein the means for determining the traffic-rule model comprise means for determining the traffic-rule model to be both time-bounded and of static memory allocation.

Clause 48. The non-transitory, processor-readable storage medium of either clause 46 or clause 47, wherein the traffic-rule model is a selected traffic-rule model, and wherein the processor-readable instructions to cause the at least one processor to determine the selected traffic-rule model comprise processor-readable instructions to cause the at least one processor to:

determine a first potential traffic-rule model by fitting a first model to the plurality of input data sets, the plurality of answer sets, and the set of traffic rules corresponding to each of the plurality of answer sets;

determine a second potential traffic-rule model by fitting a second model to the plurality of input data sets, the plurality of answer sets, and the set of traffic rules corresponding to each of the plurality of answer sets; and select one of the first potential traffic-rule model and the second potential traffic-rule model as the selected traffic-rule model.

Clause 49. The non-transitory, processor-readable storage medium of clause 48, wherein the processor-readable instructions to cause the at least one processor to select one of the first potential traffic-rule model and the second potential traffic-rule model as the selected traffic-rule model comprise processor-readable instructions to cause the at least one processor to select as the selected traffic-rule model the model, of the first potential traffic-rule model and the second potential traffic-rule model, that has a lower corresponding static memory allocation.

Clause 50. The non-transitory, processor-readable storage medium of any of clauses 46-49, further comprising processor-readable instructions to cause the at least one processor to transmit, to an ego vehicle, the traffic-rule model.

Clause 51. The non-transitory, processor-readable storage medium of any of clauses 46-50, further comprising processor-readable instructions to cause the at least one processor to transmit, to an ego vehicle, traffic-model update information for updating the traffic-rule model.

Clause 52. The non-transitory, processor-readable storage medium of any of clauses 46-51, wherein the processor-readable instructions to cause the at least one processor to determine the plurality of answer sets for the plurality of input data sets comprise processor-readable instructions to cause the at least one processor to apply a satisfiability solver to each of the plurality of input data sets.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors. Also, a "set" as used herein includes one or more members, and a "subset" contains fewer than all members of the set to which the subset refers.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, a list of items prefaced by "at least one of" or prefaced by "one or more of" indicates a disjunctive list such that, for example, a list of "at least one of A, B, or C," or a list of "at least one of A, B, and C," or a list of "one or more of A, B, or C", or a list of "one or more of A, B, and C," or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of determining acceptable actions for autonomous driving, the method comprising:

receiving, from a network entity, an indication of a traffic-rule model to be used locally by an ego vehicle, wherein the traffic rule model is at least one of time-bounded or of a static memory allocation;

obtaining, at the ego vehicle via one or more sensors, a set of input values indicative of a driving environment of the ego vehicle; and evaluating, at the ego vehicle, the set of input values with the traffic-rule model to determine an answer set of one or more indications of whether one or more corresponding driving actions are acceptable in view of the set of input values and an applicable set of traffic rules corresponding to the driving environment.

2. The method of claim 1, wherein the traffic-rule model is both time-bounded and of a static memory allocation.

3. The method of claim 1, wherein the traffic-rule model comprises a decision tree.

4. The method of claim 1, wherein the traffic-rule model comprises a symbolic regression model.

5. The method of claim 4, wherein evaluating the set of input values with the traffic-rule model comprises evaluating a respective symbolic regression model mathematical expression for each of the one or more indications, of the answer set, of whether the one or more corresponding driving actions are acceptable.

6. The method of claim 1, further comprising updating the traffic-rule model based on model update information received by the ego vehicle from the network entity.

7. An ego vehicle comprising:

at least one transceiver;

at least one memory; and at least one processor communicatively coupled to the at least one transceiver and the at least one memory and configured to:

receive, from a network entity, a traffic-rule model to be used locally by the ego vehicle, wherein the traffic rule model is at least one of time-bounded or of a static memory allocation;

obtain, via one or more sensors, a set of input values indicative of a driving environment of the ego vehicle; and evaluate the set of input values with the traffic-rule model to determine an answer set of one or more indications of whether one or more corresponding driving actions are acceptable in view of the set of input values and an applicable set of traffic rules corresponding to the driving environment.

8. The ego vehicle of claim 7, wherein the traffic-rule model is both time-bounded and of a static memory allocation.

9. The ego vehicle of claim 7, wherein the traffic-rule model comprises a decision tree.

10. The ego vehicle of claim 7, wherein the traffic-rule model comprises a symbolic regression model.

11. The ego vehicle of claim 10, wherein to evaluate the set of input values with the traffic-rule model the at least one processor is configured to evaluate a respective symbolic regression model mathematical expression for each of the one or more indications, of the answer set, of whether the one or more corresponding driving actions are acceptable.

12. The ego vehicle of claim 7, wherein the at least one processor is configured to update the traffic-rule model based on model update information received via the at least one transceiver from the network entity.

13. An apparatus comprising:

at least one memory; and at least one processor communicatively coupled to the at least one memory and configured to:

determine a plurality of answer sets for a plurality of input data sets, each of the plurality of input data sets comprising a plurality of first indications each indicating a status of a corresponding environmental condition, each of the plurality of answer sets comprising a plurality of second indications each indicating whether a corresponding driving action is acceptable, and each of the plurality of answer sets satisfying a corresponding set of traffic rules;

determine a traffic-rule model, that is at least one of time-bounded and of a static memory allocation, by fitting a model to the plurality of input data sets, the plurality of answer sets, and a set of traffic rules corresponding to each of the plurality of answer sets; and transmit, to an ego vehicle, an indication of the traffic-rule model to be used locally at the ego vehicle in accordance with the determination.

14. The apparatus of claim 13, wherein to determine the traffic-rule model the at least one processor is configured to determine the traffic-rule model to be both time-bounded and of the static memory allocation.

15. The apparatus of claim 13, wherein the traffic-rule model is a selected traffic-rule model, and wherein to determine the selected traffic-rule model the at least one processor is configured to:

determine a first potential traffic-rule model by fitting a first model to the plurality of input data sets, the plurality of answer sets, and the set of traffic rules corresponding to each of the plurality of answer sets;

determine a second potential traffic-rule model by fitting a second model to the plurality of input data sets, the plurality of answer sets, and the set of traffic rules corresponding to each of the plurality of answer sets; and select one of the first potential traffic-rule model and the second potential traffic-rule model as the selected traffic-rule model.

16. The apparatus of claim 15, wherein to select one of the first potential traffic-rule model and the second potential traffic-rule model as the selected traffic-rule model the at least one processor is configured to select as the selected traffic-rule model the model, of the first potential traffic-rule model and the second potential traffic-rule model, that has a lower corresponding static memory allocation.

17. The apparatus of claim 13, further comprising at least one transceiver communicatively coupled to the at least one processor, wherein the at least one processor is configured to transmit, via the at least one transceiver to the ego vehicle, the traffic-rule model.

18. The apparatus of claim 13, further comprising at least one transceiver communicatively coupled to the at least one processor, wherein the at least one processor is configured to transmit, via the at least one transceiver to the ego vehicle, traffic-model update information for updating the traffic-rule model.

19. The apparatus of claim 13, wherein to determine the plurality of answer sets for the plurality of input data sets the at least one processor is configured to apply a satisfiability solver to each of the plurality of input data sets.

* * * * *